Dec. 8, 1959     N. F. RITCHEY     2,916,623

METHOD AND MEANS FOR DETECTING FLAWS IN METALS

Filed May 2, 1958

INVENTOR.
NEIL F. RITCHEY
BY
ATTORNEY

United States Patent Office 2,916,623
Patented Dec. 8, 1959

2,916,623

METHOD AND MEANS FOR DETECTING FLAWS IN METALS

Neil F. Ritchey, Westtown, Pa., assignor to Knapp Mills Incorporated, Long Island City, N.Y., a corporation of New York Application May 2, 1958, Serial No. 732,682

10 Claims. (Cl. 250—65)

The present invention relates to a method for detecting flaws in metals and more particularly to a non-destructive method of detecting such flaws in metal plates or other metal units and in the welding used to weld such metal plates or units together.

It is common knowledge that metal castings, metal plates and welds sometimes have flaws or voids therein. Some of these flaws are so great that they cannot be corrected while others are smaller and can be removed. It is therefore important to test such metal plates, castings and welds to determine whether or not a flaw is present therein. If there is a flaw therein which can be corrected, the metal is chipped-away so as to expose and remove the flaw or void.

The present practice of detecting flaws and voids is to first take an X-ray or radiograph of the metal plates, units or welding. If there are flaws or voids in the metal or in the weld, they will appear as a shadow on the X-ray. The metal or welded part is then chipped away to form a cavity until the flaws or voids are exposed and removed. A second X-ray is then taken to make certain that there are no other flaws or voids in the metal or the welding. If there are no other flaws or voids present in the metal, the cavity is refilled with the metal and a third X-ray is then taken to make certain that there are no additional flaws in the filled-in portion of the metal.

One difficulty encountered with this method is that when the second X-ray is taken, the cavity will appear as a shadow on the X-ray because the thickness of the metal at the cavity is less than the thickness of the rest of the metal. Therefore, it is difficult to tell whether a shadow on the second X-ray is caused by a flaw or is merely the cavity in the metal. This is particularly true where there is an additional flaw directly behind the cavity. In that event, the shadow resulting from the cavity obscures the shadow formed by the additional flaw and makes it almost impossible to detect the presence of such additional flaws. Hence, when the cavity is refilled with metal and the additional void or flaw is detected by the third X-ray, the metal must be chipped-away again to remove the additional flaw. This results in duplication of the work involved. The above procedure has been time-consuming, laborious, tedious and unduly expensive. The problems involved will be more fully appreciated if the metal has three or more flaws directly behind each other.

Another problem encountered is that the shadow formed by the cavity on the X-ray makes it difficult to determine whether the cavity formed is deep enough to eliminate the flaw.

The present invention eliminates these disadvantages and provides an improved method of detecting such flaws which permits positive identification of flaws or voids in metal.

Another object of the present invention is to provide an improved method of detecting flaws which will permit identification of flaws and voids located directly behind another flaw.

Another object of the present invention is to provide a process of detecting flaws which will avoid duplication of work.

A further object of the present invention is the method of detecting flaws in metal which is simple and inexpensive to perform.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
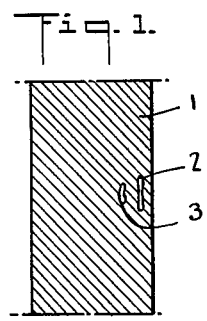
Fig. 1 is a sectional view of a metal sheet or other metal unit showing a plurality of flaws or voids therein.
Figure 2:
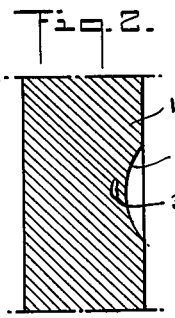
Fig. 2 is a sectional view similar to Fig. 3 showing the metal chipped away to form a cavity to remove one of the flaws, with the other flaw remaining undisturbed.

Briefly, the process of the present invention comprises the filling of the cavity formed by chipping away the metal with a metallic putty-like compound having substantially the same opacity to X-rays or other radiograph radiations as the metal in which the flaw appears. When the second X-ray is then taken, the cavity will not form a shadow since the metallic putty-like substance therein has substantially the same opacity to radiation as the metal and since the effective thickness of the metal sheet at the filled-in cavity will be the same as the thickness of the rest of the metal sheet.

Referring to the drawings, and particularly to Figs. 1 to 5, a sheet or plate unit of metal 1 is shown. The structure 1 may be made of steel or any other metal.

Fig. 1 shows the metal sheet 1 having a pair of voids or flaws 2 and 3 therein. The flaws 2 and 3 are in line with each other, one behind the other. When the sheet 1 is X-rayed, the flaw 2 will show up as shadows, but the flaw 3 will not be detected since it is directly behind the flaw 2.

The second step in the method comprises chipping away the metal to form a cavity 4 (Fig. 2) which exposes and removes the flaw 2.

Figure 3:
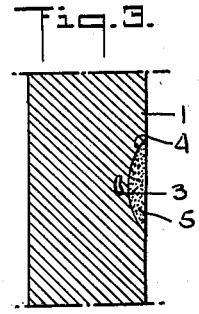
Fig. 3 shows a similar sectional view the cavity filled in accordance with the present invention to permit it to be X-rayed.

The third step in the process is shown in Fig. 3 and comprises filling the cavity 4 with a metallic putty-like compound 5 which has substantially the same opacity to radiation as the metal of the sheet 1. As shown in Fig. 3, the metal putty fills in all the crevices and uneven surfaces in the cavity 4 and its outer surface is flush with the outer edge of the metal sheet 1 so that the effective thickness of the metal at the cavity 4 is equal to the thickness of the rest of the metal sheet 1.

A second X-ray is then taken of the metal after the metallic putty-like substance has been placed in the cavity 4. Since the metallic putty-like substance fills in all uneven surfaces of the cavity 4 and since it is of substantially the same opacity to radiation as the metal sheet 1, no shadow will appear on the X-ray and only the additional flaw 3 in the metal directly behind cavity 4 will show up as a shadow on the X-ray.

Figure 4:
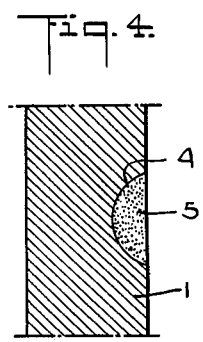
Fig. 4 shows a similar sectional view showing the cavity extended to remove the additional flaw.

The flaw 3 can then be removed by chipping away the metal again to extend the cavity 4 to expose and remove the additional flaw 3, as shown in Fig. 4. The extended cavity 4 is then filled with the metallic putty-like substance 5 and an additional X-ray can then be taken to determine whether there are any additional flaws.

Figure 5:
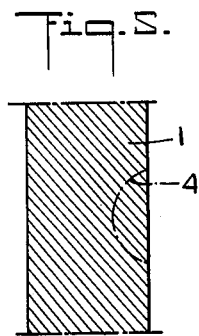
Fig. 5 is a sectional view showing the metal after the second X-ray has been taken and the cavity has been refilled with metal.
Figure 6:
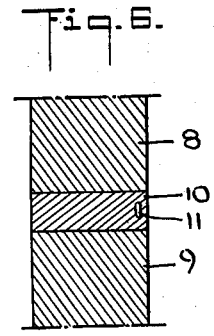
Fig. 6 is a sectional view showing a weld greatly exaggerated in width between the edges of metal sheets having a flaw therein.

If there are no additional flaws the metallic putty-like substance 5 can be removed from the cavity 4 and cavity 4 can be filled with metal, as shown in Fig. 5. A third X-ray can then be taken to make certain that there are no additional flaws in the metal used to fill in the cavity 4.

It will be seen from the above that the use of a metallic putty-like compound to fill in the cavity 4 will prevent the cavity 4 from forming a shadow on the X-ray and will insure that any shadows appearing on the X-ray can only be due to the presence of flaws.

The metallic putty-like substance taken out of cavity 4 may in many cases be stored until it is to be used to again detect flaws in other metal objects.

The same method can also be used to detect flaws and voids in the weld between two metal sheets. This is shown in Fig. 6 through 9 wherein the metal sheets 8 and 9 are welded together by the weld 10, which is greatly enlarged in width.

Figure 7:
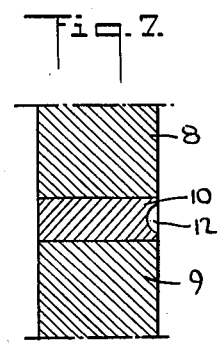
Fig. 7 shows the portion of the weld chipped-away to expose and remove the flaw.
Figure 8:
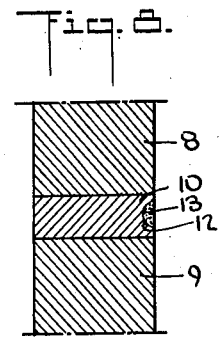
Fig. 8 shows the cavity filled in accordance with the present invention to permit it to be X-rayed.
Figure 9:
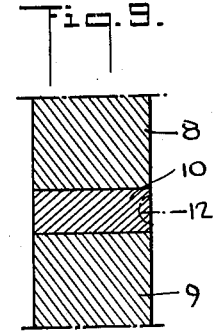
Fig. 9 shows the welding after the second X-ray has been taken and the cavity re-filled or re-welded.

If a cavity 11 is present in the weld 10, an initial X-ray will show this flaw as a shadow. The portion of the weld is then chipped away to form a cavity 12, as shown in Fig. 7, and the cavity 12 is filled in by a metallic putty-like compound 13 having an opacity to radiation rays substantially equal to the opacity of the weld 10, as shown in Fig. 8. When the second X-ray is taken, the cavity 12 will not form a shadow and if any shadows appear in the X-ray, it will readily be known that additional flaws are present in the weld. If there are no additional flaws, the metallic putty 13 can be removed, and the cavity 12 re-welded.

The present method can also be used to detect flaws in metal units having an uneven surface. In this case, the metallic putty-like compound can be spread over the uneven surface, thereby producing a uniform thickness which will not form any shadows on an X-ray taken to detect flaws.

The metallic putty-like substance used to fill the cavity formed by chipping away the metal sheet or weld is preferably a powdered metallic substance mixed with an oil, grease or wax to form a putty-like pliable substance which can be worked to fill in all the crevices in the cavity. Such a metallic putty compound is described in pending Alfred P. Knapp United States patent application, Serial No. 349,565, now Patent No. 2,833,664, dated May 6, 1958.

The particular type of putty-like substance used will vary in density depending upon the type of steel and the energy of the X-ray beam. The compositions used will depend on the degree of working; the density of the powdered metal used, the temperature and the time cycle of processing. For example, the putty used to detect flaws in steel will require an effective shielding density or opacity of between 6.5 to 8.0 depending upon the type of steel used and may be comprised of a mixture of powdered lead with an oil, grease, or wax, in which the oil, grease, or wax is 3 to 6% by weight with the remainder powdered lead. However, it will be understood that the proportions and ingredients of the metallic putty-like compound used for filling the cavity may be changed as may be required for use in connection with different types of metals. One manner of changing the proportions would consist of varying the amounts of oil, grease or wax used.

It is also within the scope of the present invention to use a putty which may not have a metallic base, and it is also within the scope of this invention to use a substance which is not in a putty-like state, for example, a powder may also be used, if desired, as long as the effective shielding density or opacity of the material used is substantially equal to the opacity of the metal with which it will be used.

It will be seen from the above that the present invention provides a method of detecting flaws which permits positive identification of flaws; which will permit identification of flaws located directly behind a flaw; and which is simple and inexpensive to operate.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of detecting flaws in metal having an uneven surface, which comprises filling the uneven surface with an auxiliary substance having an opacity to radiation substantially equal to the opacity of the metal and directing penetrating rays upon said surface to detect flaws therein.

2. The method of detecting flaws in a metal member having an uneven surface which comprises filling the uneven surface with a metal-carrying putty-like substance having an opacity to radiation substantially equal to that of the metal member and directing penetrating rays upon said surface to detect flaws therein.

3. The method of detecting flaws in metal which comprises testing said metal to determine the presence of an initial flaw therein, forming a cavity in the metal to remove said initial flaw, filling said cavity with a putty-like substance having substantially the same opacity to radiation as the metal, and directing penetrating rays on said metal to determine the presence of additional flaws.

4. The method of detecting flaws in a metal member which comprises testing said metal member to determine the presence of an initial flaw in the metal member, forming a cavity in the metal to remove said initial flaw, filling said cavity with a metal-carrying putty-like substance having an opacity to radiation substantially equal to that of the metal member and directing penetrating rays on said cavity to determine the presence of additional flaws behind the cavity.

5. The method of detecting flaws in metal which comprises testing said metal to determine the presence of an initial flaw in the metal, forming a cavity in the metal to remove said initial flaw, filling said cavity with a metallic putty-like substance having substantially the same opacity to radiation as the metal, and directing penetrating rays on said cavity to determine the presence of additional flaws behind the cavity.

6. The method of detecting flaws in metal which comprises passing a penetrating ray through said metal to determine the presence of an initial flaw, forming a cavity in said metal to expose said flaw, filling said cavity with a metallic putty-like substance having substantially the same opacity to radiation as the metal, and directing a penetrating ray on said cavity to determine the presence of additional flaws in said metal.

7. The method of detecting flaws in metal which comprises passing a penetrating ray through said metal to determine the presence of a flaw, forming a cavity in said metal to expose said flaw, filling said cavity with a metallic putty-like substance having substantially the same opacity to radiation as the metal, directing a penetrating ray through said filled cavity to determine the presence of additional flaws in said metal, removing said metallic putty-like substance and re-filling said cavity with said metal.

8. The method of detecting flaws in metal sheets which comprises subjecting said metal sheets to X-rays to determine the presence of a flaw, forming a cavity in said metal sheet to expose said flaw, filling said cavity with a metallic putty-like substance having substantially the same opacity to radiation as the metal sheet, and subjecting said filled cavity to X-rays to determine the presence of additional flaws therein.

9. The method of detecting flaws in a metal sheet which comprises subjecting said metal sheet to X-rays to determine the presence of a flaw, forming a cavity in said metal sheet to expose said flaw, filling said cavity with a metallic putty-like substance having substantially the same opacity to radiation as the metal sheet, subjecting said filled cavity to X-rays to determine the presence of additional flaws in said metal, removing said metallic putty-like substance from said cavity, and re-filling said cavity with metal.

10. The method of detecting flaws in a metal sheet as claimed in claim 9, wherein said metallic putty-like substance is comprised of a powdered lead base.

References Cited in the file of this patent

UNITED STATES PATENTS

| | | |
|---|---|---|
| 753,310 | Price | Mar. 1, 1904 |
| 1,622,149 | St. John | Mar. 22, 1927 |
| 2,162,178 | Marasco | June 13, 1939 |
| 2,162,420 | Buckley | June 13, 1939 |
| 2,475,596 | Dawson | July 12, 1949 |
| 2,719,926 | Proctor et al. | Oct. 4, 1955 |
| 2,726,339 | Borst | Dec. 6, 1955 |
| 2,833,664 | Knapp | May 6, 1958 |
| 2,870,336 | Fountain et al. | Jan. 20, 1959 |

OTHER REFERENCES

Croxon: "The Detection of Cracks by X-Rays and Gamma Rays," Electronic Engineering, April 1948, pages 106–111.